(12) United States Patent
Anderson

(10) Patent No.: US 6,205,131 B1
(45) Date of Patent: Mar. 20, 2001

(54) BROADBAND IMPLEMENTATION OF SUPPLEMENTAL CODE CHANNEL CARRIER PHASE OFFSETS

(75) Inventor: Kraig L. Anderson, San Diego, CA (US)

(73) Assignees: Sony Corporation, Tokya (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 08/992,368

(22) Filed: Dec. 16, 1997

(51) Int. Cl.[7] ............................. H04B 7/216; H04B 15/00
(52) U.S. Cl. ............................................. 370/335; 375/130
(58) Field of Search ................................ 370/320, 324, 370/335, 342, 350; 375/130, 135, 146

(56) References Cited

U.S. PATENT DOCUMENTS

| | | | |
|---|---|---|---|
| 3,660,596 | 5/1972 | Numakura | 178/5.2 |
| 4,990,911 | 2/1991 | Fujita | 341/123 |
| 5,103,459 | * 4/1992 | Gilhousen et al. | 370/209 |
| 5,257,102 | 10/1993 | Wilkinson | 358/140 |
| 5,446,727 | 8/1995 | Bruckert et al. | 370/18 |
| 5,469,471 | * 11/1995 | Wheatley, III | 370/335 |
| 5,596,571 | * 1/1997 | Gould et al. | 370/335 |
| 5,708,658 | * 1/1998 | Sugita | 370/335 |
| 5,737,326 | * 4/1998 | Chih-Lin I et al. | 370/335 |
| 5,809,020 | * 9/1998 | Bruckert et al. | 370/335 |
| 5,854,785 | * 12/1998 | Willey | 370/332 |
| 5,940,430 | * 8/1999 | Love et al. | 375/200 |

OTHER PUBLICATIONS

"Planet Graphics is aiming to orbit the internet", Littman Craines Chicago Business, p.18 Dec. 9, 1996.
New York Times Sep. 30, 1996, "Applying pay–per–view idea to the Compact Disk Business", Feder.

\* cited by examiner

*Primary Examiner*—Chau Nguyen
*Assistant Examiner*—Chiho Andrew Lee
(74) *Attorney, Agent, or Firm*—Philip M. Shaw, Jr.; Crosby, Heafey, Roach & May

(57) ABSTRACT

Reverse channel circuitry for CDMA based mobile stations which allows carrier phase offsets to be implemented at baseband, thereby eliminating the need for multiple quadrature modulators and excessive D/A converters. In addition, just four baseband filters, two using scaled coefficients and the other two unscaled coefficients, are time multiplexed to produce in-phase and quadrature terms. The invention can lead to a significant savings in hardware and be a valuable tool in implementing multiple code channels with different carrier phase offsets.

17 Claims, 3 Drawing Sheets

US 6,205,131 B1

BROADBAND IMPLEMENTATION OF SUPPLEMENTAL CODE CHANNEL CARRIER PHASE OFFSETS

BACKGROUND OF THE INVENTION

1. Technical Field

This invention pertains to reverse traffic channel circuitry for Code Division Multiple Access (CDMA) based mobile stations and, more particularly, to a method for performing carrier phase offsets at baseband which permits n+1 channels to be added at baseband and modulated with a single quadrature modulator.

2. Background Art

In Code Division Multiple Access (CDMA) based mobile stations, multiple code channels can be used in the reverse traffic channel to increase the data transmission rate. For example, in IS-95B, one fundamental code channel can be used in combination with up to seven supplemental code channels. Under rate set 1, where each code channel has a maximum data rate of 9.6 kbps, the combined data rate can be increased to 76.8 kbps. Under rate set 2, the maximum data rate would be 115.2 kbps The supplemental channels are typically transmitted with different phase offsets of the carrier used to transmit the fundamental channel. The supplemental code channel carrier phase offsets measured with respect to the fundamental carrier for IS-95B are given in Table 1.

TABLE 1

Supplemental code carrier phase offsets

| Supplemental Code Channel is: | Carrier Phase Offset $\phi_i$ (radiant): |
|---|---|
| 1 | $\pi/2$ |
| 2 | $\pi/14$ |
| 3 | $3\pi/4$ |
| 4 | 0 |
| 5 | $\pi/2$ |
| 6 | $\pi/4$ |
| 7 | $3\pi/4$ |

FIG. 1 shows how multiple code channels $A_0, A_1, \ldots A_n$, can be combined with different carrier phase offsets, $\phi_i$, to produce the RF signal, S(t). Multiple data streams, $A_0, A_1, \ldots A_n$, are separately quadrature spread by pairs of quadrature spreaders 12 (actually modulo 2 adders) and baseband filtered by pairs of filters 14 before being quadrature modulated with the appropriately offset carrier by pairs of quadrature modulators 18. Note that the Q-channel output from the spreader 12 has a ½ PN chip delay 22 (=406.9 ns). If the reverse traffic channel were implemented as suggested in FIG. 1, a D/A converter 16 would be required for the output of each baseband filter 14 along with n+1 quadrature modulators 18. Only if there are no carrier phase offsets between the supplemental channels and the fundamental channel can the outputs of the n+1 in-phase baseband filters be summed together as can the outputs of the n+1 quadrature baseband filters. In such case, a single quadrature modulator can be used to produce S(t).

From a cost standpoint it would be desirable if only a single D/A converter and quadrature modulator were required regardless of the carrier phase offsets.

SUMMARY OF THE INVENTION

The above discussed problem of providing a reverse traffic channel circuit for CDMA based mobile stations which minimizes the number of D/A converters and quadrature modulators is overcome by the present invention which comprises a plurality of input terminal means for separately receiving a digital fundamental input signal $A_0$ and a plurality of digital supplemental channel input signals $A_1$ to $A_7$, quadrature spreading means for quadrature spreading the fundamental channel input signal and each supplemental channel input signal to produce, respectively, a fundamental in-phase channel signal $F_i$, and a fundamental quadrature channel signal Fq, and separate supplemental in-phase channel signals $S_{1i}, S_{2i}, \ldots S_{7i}$, and supplemental quadrature channel signals $S_{1q}, S_{2q}, \ldots S_{7q}$, and filtering means for separately filtering the fundamental in-phase channel signal $F_i$, the fundamental quadrature channel signal $F_q$, the separate supplemental in-phase channel signals $S_{1i}, S_{2i}, \ldots S_{7i}$, and the separate supplemental quadrature channel signals $S_{1q}, S_{2q}, \cdot S_{7q}$.

First combining means are provided for combining the filtered fundamental in-phase channel signal $F_i'$, some of the separate filtered supplemental in-phase channel signals $S_{1i}', S_{2i}', \ldots S_{7i}'$, and some of the separate filtered supplemental quadrature channel signals $S_{1q}', S_{2q}', \ldots S_{7q}'$ according to the following formula:

$$\left[ F_i' + S_{1q}' + \frac{S_{2i}'}{\sqrt{2}} + \frac{S_{2q}'}{\sqrt{2}} - \frac{S_{3i}'}{\sqrt{2}} + \right.$$
$$\left. \frac{S_{3q}'}{\sqrt{2}} + S_{4i}' + S_{5q}' + \frac{S_{6i}'}{\sqrt{2}} + \frac{S_{6q}'}{\sqrt{2}} - \frac{S_{7i}'}{\sqrt{2}} + \frac{S_{7q}'}{\sqrt{2}} \right]$$

to produce an overall in-phase digital output signal. Second combining means are provided for combining the filtered fundamental quadrature channel signal $F_q'$, some of the separate filtered supplemental in-phase channel signals $S_{1i}', S_{2i}', \ldots S_{7i}'$, and some of the separate filtered supplemental quadrature channel signals $S_{1q}', S_{2q}', S_{7q}'$ according to the following formula:

$$\left[ F_q' - S_{1i}' - \frac{S_{2i}'}{\sqrt{2}} + \frac{S_{2q}'}{\sqrt{2}} - \frac{S_{3i}'}{\sqrt{2}} - \right.$$
$$\left. \frac{S_{3q}'}{\sqrt{2}} + S_{4q}' - S_{5i}' - \frac{S_{6i}'}{\sqrt{2}} + \frac{S_{6q}'}{\sqrt{2}} - \frac{S_{7i}'}{\sqrt{2}} - \frac{S_{7q}'}{\sqrt{2}} \right]$$

to produce an overall quadrature digital output signal.

Further provided are digital to analog means for converting each of the overall in-phase digital output signal and the overall quadrature digital output signal into a corresponding overall in-phase analog output signal and a corresponding overall analog quadrature output signal, respectively, and quadrature modulating means for quadrature modulating the overall in-phase analog output signal with a carrier term $\cos(2\pi f_c t)$ to produce a first quadrature modulated result signal, quadrature modulating the overall quadrature analog output signal with a carrier term $\sin(2\pi f_c t)$ to produce a second quadrature modulated result signal, where $f_c$ is the carrier frequency and t is time, and combining the first quadrature modulated result signal with the second quadrature modulated result signal to produce a radio frequency output signal S(t).

In a preferred embodiment, in the quadrature channels of each of the fundamental channel and the supplemental channels, separate delay means are connected in series between the quadrature spreading means and the filtering means for delaying the quadrature spread signals by a predetermined delay period. The delay period is 406.9 ns.

The filtering means of the preferred embodiment comprises four pairs of filters for filtering the in-phase channels and four pairs of filters for filtering the quadrature channels. The filtering means includes unscaled filtering means for separately filtering the signals $F_i$, $F_q$, $S_{1i}$, $S_{1q}$, $S_{4i}$, $S_{4q}$, $S_{5i}$, and $S_{5q}$ and scaled filtering means for separately filtering the signals $S_{2i}$, $S_{2q}$, $S_{3i}$, $S_{3q}$, $S_6 S_{6q}$, $S_{7i}$, and $S_{7q}$. The scaled filtering scales signals by a factor of $$\frac{1}{\sqrt{2}}.$$

It will be appreciated that the invention also encompasses the method steps performed by the above described circuit components of the first embodiment of the invention.

A second preferred embodiment of the invention is a reverse traffic channel circuit for CDMA based mobile stations which also includes a plurality of input terminal means for separately receiving a digital fundamental input signal $A_0$ and a plurality of digital supplemental channel input signals $A_1$ to $A_7$, and quadrature spreading means for quadrature spreading the fundamental channel input signal and each supplemental channel input signal to produce, respectively, a fundamental in-phase channel signal $F_i$, and a fundamental quadrature channel signal $F_q$, and separate supplemental in-phase channel signals $S_{1i}$, $S_{2i}$, ... $S_{7i}$, and supplemental quadrature channel signals $S_{1q}$, $S_{2q}$, $S_{7q}$.

However, the second embodiment differs from the first embodiment by providing first combining means for combining the fundamental in-phase channel signal $F_i$, some of the separate supplemental in-phase channel signals $S_{1i}$, $S_{2i}$, ... $S_{7i}$, and some of the separate supplemental quadrature channel signals $S_{1q}$, $S_{2q}$, ... $S_{7q}$ according to the following groupings (set off by parenthesis):

$$(F_i + S_{4i}); \left( \frac{S_{2i}}{\sqrt{2}} - \frac{S_{3i}}{\sqrt{2}} + \frac{S_{6i}}{\sqrt{2}} - \frac{S_{7i}}{\sqrt{2}} \right); \quad (a)$$

$$(S_{1q} + S_{5q}); \left( \frac{S_{2q}}{\sqrt{2}} + \frac{S_{3q}}{\sqrt{2}} + \frac{S_{6q}}{\sqrt{2}} + \frac{S_{7q}}{\sqrt{2}} \right),$$

and second combining means for combining the fundamental quadrature channel signal $F_q$, some of the separate supplemental in-phase channel signals $S_{1i}$, $S_{2i}$, ... $S_{7i}$, and some of the separate supplemental quadrature channel signals $S_{1q}$, $S_{2q}$, ... $S_{7q}$ according to the following groupings (set off by parenthesis):

$$(F_q + S_{4q}); \left( -\frac{S_{2i}}{\sqrt{2}} - \frac{S_{3i}}{\sqrt{2}} - \frac{S_{6i}}{\sqrt{2}} - \frac{S_{7i}}{\sqrt{2}} \right); \quad (b)$$

$$(-S_{1i} - S_{5i}); \left( \frac{S_{2q}}{\sqrt{2}} - \frac{S_{3q}}{\sqrt{2}} + \frac{S_{6q}}{\sqrt{2}} + \frac{S_{7q}}{\sqrt{2}} \right),$$

Thus, there is a combining of the constituent signals before any filtering takes place.

In the second preferred embodiment, the filtering means are provided for separately filtering each of the signals of the groupings (a) and (b) above and third combining means are provided for combining the filtered signal groupings of group (a) to produce an overall in-phase digital output signal and fourth combining means are provided for combining the filtered signal groupings of group (b) to produce an overall quadrature digital output signal. The actual scaling by $1/\sqrt{2}$ is done in the filtering.

Digital to analog means convert each of the overall in-phase digital output signal and the overall quadrature digital output signal into a corresponding overall in-phase analog output signal and a corresponding overall analog quadrature output signal, respectively. Lastly, quadrature modulating means quadrature modulate the overall in-phase analog output signal with a carrier term $\cos(2\pi f_c t)$ to produce a first quadrature modulated result signal, quadrature modulate the overall quadrature analog output signal with a carrier term $\sin(2\pi f_c t)$ to produce a second quadrature modulated result signal, where $f_c$ is the carrier frequency and $t$ is time, and combine the first quadrature modulated result signal with the second quadrature modulated result signal to produce a radio frequency output signal S(t).

It will be appreciated that the invention also encompasses the method steps performed by the above described circuit components of the second embodiment of the invention.

BRIEF DESCRIPTION OF THE DRAWINGS

The aforementioned advantages of the invention, as well as additional advantages thereof, will be more fully understood as a result of a detailed description of the preferred embodiments when taken in conjunction with the accompanying drawings in which.

DETAILED DESCRIPTION OF THE PREFERRED EMBODIMENT

This invention presents an apparatus and method for performing the carrier phase offsets at baseband which permits the n+1 channels to be added at baseband and modulated with a single quadrature modulator. To see how this is possible, trigonometric identities are used to write the two phase-offset carrier terms as $$\cos(2\pi f_c t + \phi) = \cos(2\pi f_c t)\cos(\phi) - \sin(2\pi f_c t)\sin(\phi) \quad (1)$$

$$\sin(2\pi f_c t + \phi)\cos(2\pi f_c t)\sin(\phi) + \sin(2\pi f_c t)\sin(\phi). \quad (2)$$

Substituting the possible carrier phase offsets given in Table 1 yields the following table of $\cos(2\pi f_c t+\phi)$ and $\sin(2\pi f_c t+\phi)$ terms.

TABLE 2

$\cos(2\pi f_c t + \phi)$ terms for various carrier phase offsets.

| $\phi_1$ | $\cos(2\pi f_c t \cdot \phi)$ | $\sin(2\pi f_c t \cdot \phi)$ |
|---|---|---|
| 0 | $\cos(2\pi f_c t)$ | $\sin(2\pi f_c t)$ |
| $\pi/2$ | $-\sin(2\pi f_c t)$ | $\cos(2\pi f_c t)$ |
| $\pi/4$ | $\frac{1}{\sqrt{2}}[\cos(2\pi f_c t) - \sin(2\pi f_c t)]$ | $\frac{1}{\sqrt{2}}[\cos(2\pi f_c t) + \sin(2\pi f_c t)]$ |
| $3\pi/4$ | $\frac{1}{\sqrt{2}}[-\cos(2\pi f_c t) - \sin(2\pi f_c t)]$ | $\frac{1}{\sqrt{2}}[\cos(2\pi f_c t) - \sin(2\pi f_c t)]$ |

Figure 1:
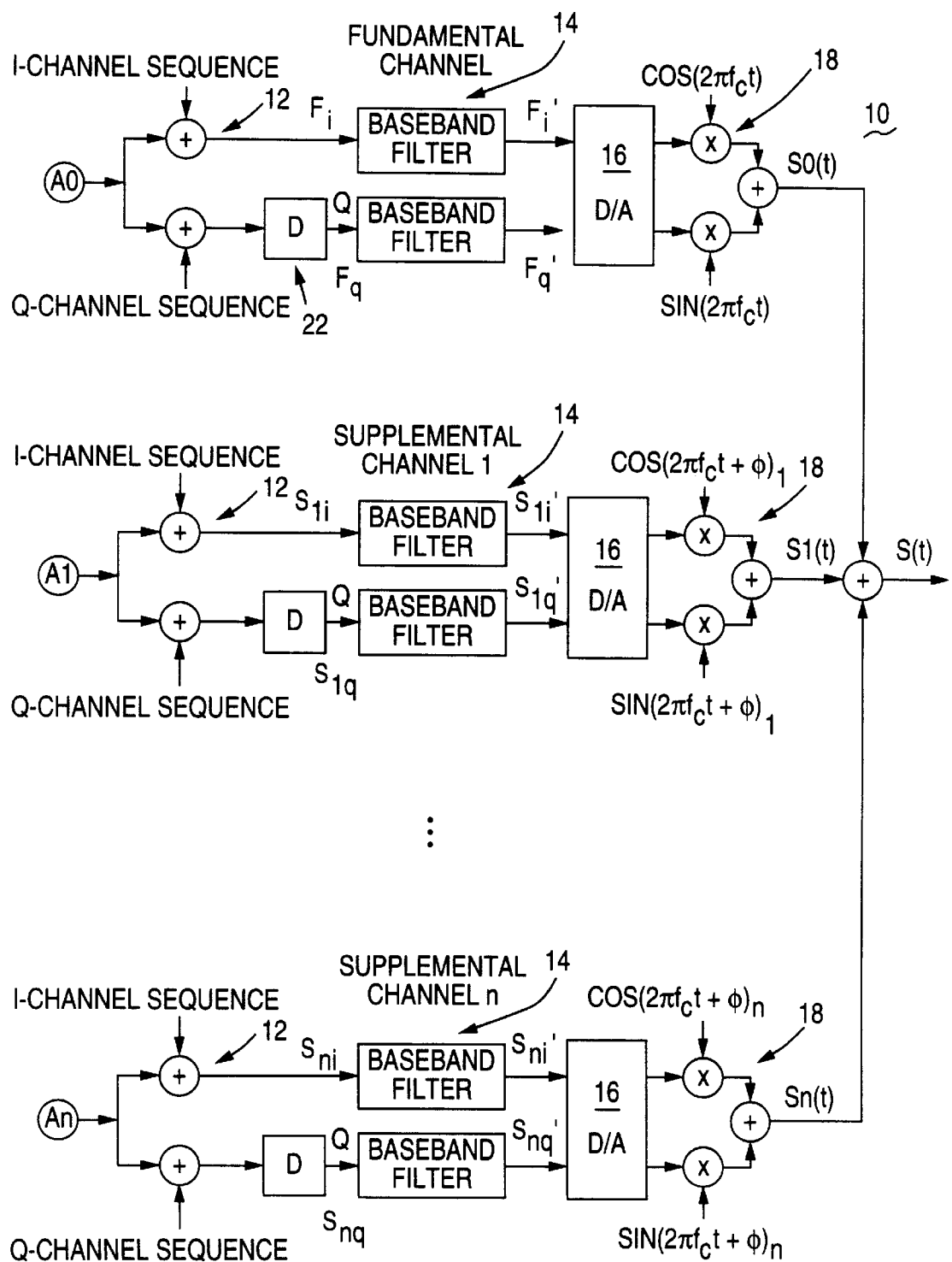
FIG. 1 is a block diagram of a conventional reverse traffic channel circuit including a fundamental code channel and n supplemental code channels.

Now, as shown in FIG. 1, denote the outputs of the baseband filters 14 for the fundamental code channel as $F_1'$ and $F_q'$ for the in-phase and quadrature channels respectively, and the output of the nth supplemental code channel baseband filters as $S_{ni}'$ and $S_{nq}'$ again for the in-phase and quadrature channels respectively. Using this notation along with Tables 1 and 2, and FIG. 1, S(t) can be expressed as the sum of the following two terms when a fundamental code channel and 7 supplemental code channels are used in the traffic channel:

$$\cos(2\pi f_c t)\left[F_i' + S_{1q}' + \frac{S_{2i}'}{\sqrt{2}} + \frac{S_{2q}'}{\sqrt{2}} - \frac{S_{3i}'}{\sqrt{2}} + \frac{S_{3q}'}{\sqrt{2}} + S_{4i}' + S_{5q}' + \frac{S_{6i}'}{\sqrt{2}} + \frac{S_{6q}'}{\sqrt{2}} - \frac{S_{7i}'}{\sqrt{2}} + \frac{S_{7q}'}{\sqrt{2}}\right], \quad (3)$$

and $$\sin(2\pi f_c t)\left[F_q' - S_{1i}' - \frac{S_{2i}'}{\sqrt{2}} + \frac{S_{2q}'}{\sqrt{2}} - \frac{S_{3i}'}{\sqrt{2}} - \frac{S_{3q}'}{\sqrt{2}} + S_{4q}' - S_{5i}' - \frac{S_{6i}'}{\sqrt{2}} + \frac{S_{6q}'}{\sqrt{2}} - \frac{S_{7i}'}{\sqrt{2}} - \frac{S_{7q}'}{\sqrt{2}}\right] \quad (4)$$

where $f_c$ is the carrier frequency (e.g. 1900 MHz.) and t is time.

A single quadrature modulator 18' (see FIG. 2) can now be used after the outputs of the various in-phase and quadrature baseband filters 14' have been scaled and combined by various adders 20 in the manner prescribed by equations (3) and (4). That is, each one of the adders 20 combines one or more of the terms set forth in the equations above. For example, the top most adder 20 in FIG. 3 performs the combination represented by $F_q'-S_{1i}'$.

Instead of scaling the outputs of the baseband filters 14' for supplemental channels 2, 3, 6, and 7, the coefficients used in these baseband filters 14' could simply be scaled by $$\frac{1}{\sqrt{2}}.$$

Figure 2:
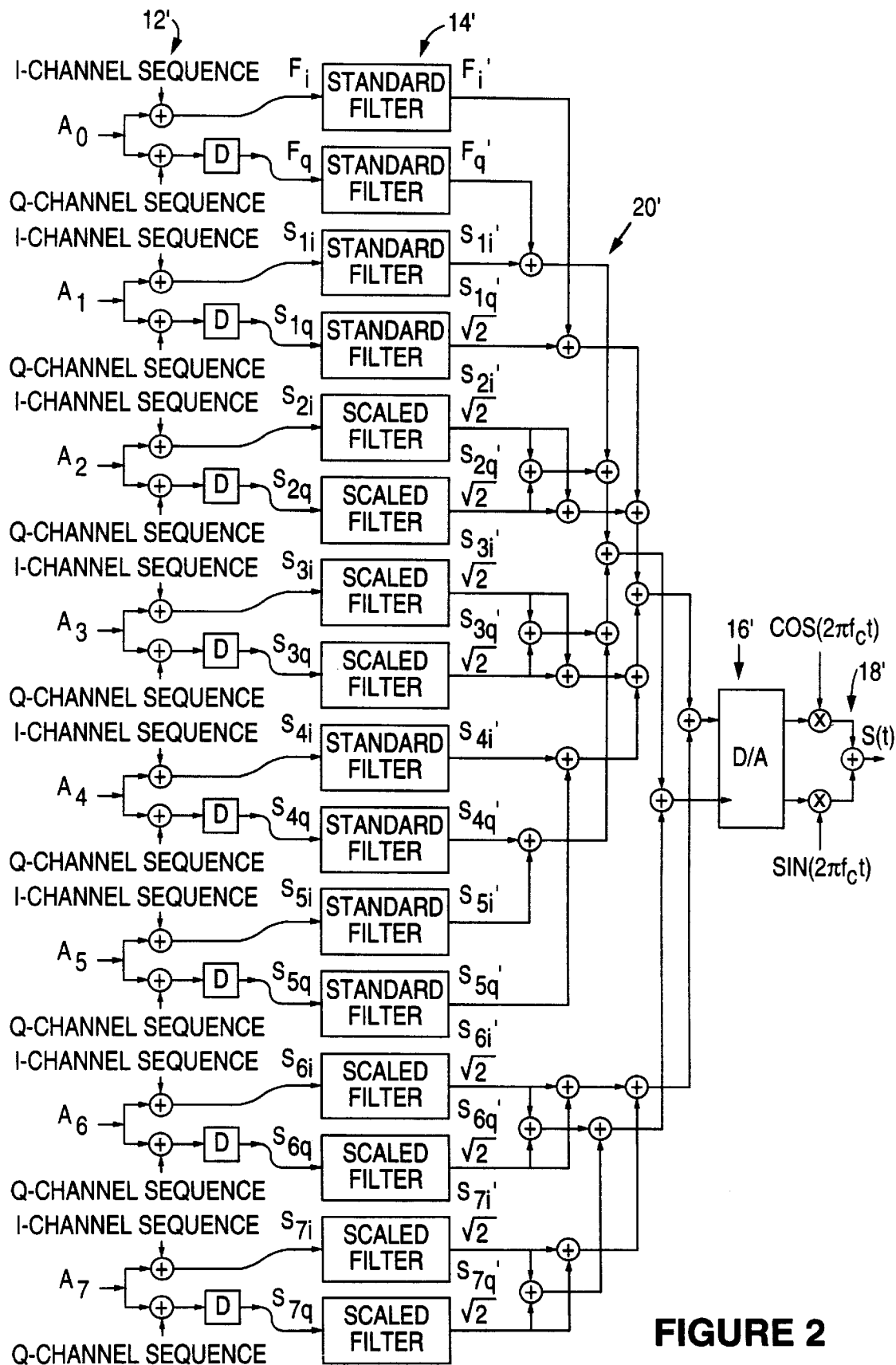
FIG. 2 is a block diagram of a reverse traffic channel circuit according to a first embodiment of the invention utilizing eight pairs of filters and a single quadrature modulator.

Four pairs of filters 14' ("Standard Filters") with unscaled coefficients for the fundamental channel and supplemental channels 1, 4, and 5 can thus be used in parallel with four pairs of filters 14' with scaled coefficients for supplemental channels 2, 3, 6, and 7. This description constitutes the first implementation approach and is illustrated in FIG. 2.

Figure 3:
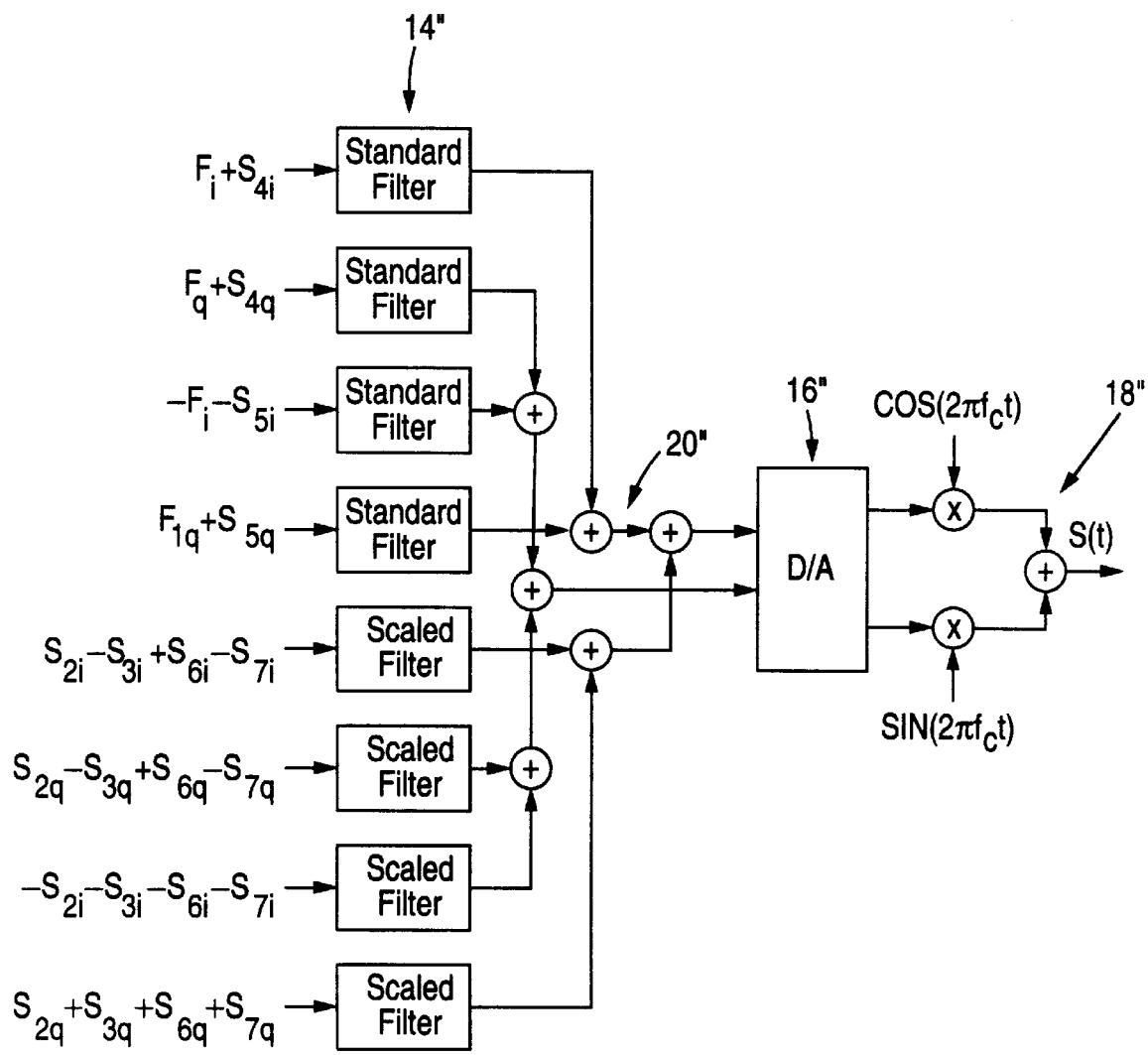
FIG. 3 is a block diagram of a filter implementation for a reverse traffic channel circuit according to a second embodiment of the invention utilizing four pairs of filters and a single quadrature modulator.

Referring now to FIG. 3, a second approach, which may provide hardware savings, is achieved by using four pairs of filters 14" instead of eight. Equations (2) and (3) can be rearranged in the following form:

$$\cos(2\pi f_c t)\left[(F_i' + S_{4i}') + \left(\frac{S_{2i}'}{\sqrt{2}} - \frac{S_{3i}'}{\sqrt{2}} + \frac{S_{6i}'}{\sqrt{2}} - \frac{S_{7i}'}{\sqrt{2}}\right) + (S_{1q}' + S_{5q}') + \left(\frac{S_{2q}'}{\sqrt{2}} + \frac{S_{3q}'}{\sqrt{2}} + \frac{S_{6q}'}{\sqrt{2}} + \frac{S_{7q}'}{\sqrt{2}}\right)\right], \quad (5)$$

and $$\sin(2\pi f_c t)\left[(F_q' + S_{4q}') + \left(-\frac{S_{2i}'}{\sqrt{2}} - \frac{S_{3i}'}{\sqrt{2}} - \frac{S_{6i}'}{\sqrt{2}} - \frac{S_{7i}'}{\sqrt{2}}\right) + (-S_{1i}' - S_{5i}') + \left(\frac{S_{2q}'}{\sqrt{2}} - \frac{S_{3q}'}{\sqrt{2}} + \frac{S_{6q}'}{\sqrt{2}} + \frac{S_{7q}'}{\sqrt{2}}\right)\right], \quad (6)$$

Due to linearity, each sum in parentheses can be performed before filtering, which reduces the number of filters to four pairs as shown in FIG. 3. Again, the actual sealing by $\sqrt{2}$ can be conveniently performed in the filters as shown in FIG. 3. Note that in FIG. 3 the inputs $A_i$, the spreaders, the delays, and the adders necessary to combine the inputs to the filters 14" according to equations (5) and (6) are omitted for the sake of clarity, but are to be understood as being included.

The disadvantage of the approach using four pairs of filters is that the input to the filters will no longer be binary numbers. Now, instead of having to perform a binary multiplication, multiplication by ±1, a real multiplication must be performed. This requirement may offset the hardware savings of using four pairs of filters 14" instead of eight pairs. In both implementation approaches, the filters could of course be time multiplexed where the in-phase terms (those to be multiplied by the cosine term) would be filtered during one time period followed by the quadrature terms (those to be multiplied by the sine term) in the next time period. This results in significant hardware savings in an actual implementation.

The inventions as described thus allow for the carrier phase offsets to be implemented at baseband, which eliminates the need for multiple quadrature modulators and excessive D/A converters. In addition, just four baseband filters, two using scaled coefficients and the other two unscaled coefficients, can now be time multiplexed to produce in-phase and quadrature terms. While a particular embodiment has been described, it should be apparent that the precepts of the invention can be expanded to an embodiment which has any number of supplemental channels with any carrier phase offsets. The invention can lead to a significant savings in hardware and be a valuable tool in implementing multiple code channels with different carrier phase offsets.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A reverse traffic channel circuit for Code Division Multiple Access (CDMA) based mobile stations, comprising:

a plurality of input terminal means for separately receiving a digital fundamental input signal $A_0$ and a plurality of digital supplemental channel input signals $A_1$ to $A_7$;

quadrature spreading means for quadrature spreading the fundamental channel input signal and each supplemental channel input signal to produce, respectively, a fundamental in-phase channel signal $F_i$, and a fundamental quadrature channel signal $F_q$, and separate supplemental in-phase channel signals $S_{1i}, S_{2i}, \ldots S_{7i}$, and supplemental quadrature channel signals $S_{1q}, S_{2q}, \ldots S_{7q}$;

filtering means for separately filtering and scaling the fundamental in-phase channel signal $F_i$, the fundamental quadrature channel signal $F_q$, the separate supplemental in-phase channel signals $S_{1i}, S_{2i}, \ldots S_{7i}$, and the separate supplemental quadrature channel signals $S_{1q}, S_{2q}, \ldots S_{7q}$;

first combining means for combining the filtered fundamental in-phase channel signal $F_i'$, some of the separate filtered supplemental in-phase channel signals $S_{1i}'$, $S_{2i}', \ldots S_{7i}'$, and some of the separate filtered supplemental quadrature channel signals $S_{1q}', S_{2q}', S_{7q}'$ according to the following formula:

$$\left[ F'_i + S'_{lq} + \frac{S'_{2i}}{\sqrt{2}} + \frac{S'_{2q}}{\sqrt{2}} - \frac{S'_{3i}}{\sqrt{2}} + \right.$$

$$\left. \frac{S'_{3q}}{\sqrt{2}} + S'_{4i} + S'_{5q} + \frac{S'_{6i}}{\sqrt{2}} + \frac{S'_{6q}}{\sqrt{2}} - \frac{S'_{7i}}{\sqrt{2}} + \frac{S'_{7q}}{\sqrt{2}} \right]$$

to produce an overall in-phase digital output signal;

second combining means for combining the filtered fundamental quadrature channel signal $F_q'$, some of the separate filtered supplemental in-phase channel signals $S_{1i}'$, $S_{2i}'$, ... $S_{7i}'$, and some of the separate filtered supplemental quadrature channel signals $S_{1q}'$, $S_{2q}'$, ... $S_{7q}'$ according to the following formula:

$$\left[ F'_q - S'_{li} - \frac{S'_{2i}}{\sqrt{2}} + \frac{S'_{2q}}{\sqrt{2}} - \frac{S'_{3i}}{\sqrt{2}} - \right.$$

$$\left. \frac{S'_{3q}}{\sqrt{2}} + S'_{4q} - S'_{5i} - \frac{S'_{6i}}{\sqrt{2}} + \frac{S'_{6q}}{\sqrt{2}} - \frac{S'_{7i}}{\sqrt{2}} - \frac{S'_{7q}}{\sqrt{2}} \right]$$

to produce an overall quadrature digital output signal;

digital to analog means for converting each of the overall in-phase digital output signal and the overall quadrature digital output signal into a corresponding overall in-phase analog output signal and a corresponding overall analog quadrature output signal, respectively; and quadrature modulating means for quadrature modulating the overall in-phase analog output signal with a carrier termcos($2\pi f_c t$) to produce a first quadrature modulated result signal, quadrature modulating the overall quadrature analog output signal with a carrier term sin($2\pi f_c t$) to produce a second quadrature modulated result signal, where $f_c$ is the carrier frequency and t is time, and combining the first quadrature modulated result signal with the second quadrature modulated result signal to produce a radio frequency output signal S(t).

2. A reverse traffic channel circuit for Code Division Multiple Access (CDMA) based mobile stations as recited in claim 1, further comprising in the quadrature channels of each of the fundamental channel and the supplemental channels, separate delay means connected in series between the quadrature spreading means and the filtering means for delaying the quadrature spread signals by a predetermined delay period.

3. A reverse traffic channel circuit for Code Division Multiple Access (CDMA) based mobile stations as recited in claim 2, wherein the delay period is 406.9 ns.

4. A reverse traffic channel circuit for Code Division Multiple Access (CDMA) based mobile stations as recited in claim 1, wherein the filtering means comprises four pairs of filters for filtering the in-phase channels and four pairs of filters for filtering the quadrature channels.

5. A reverse traffic channel circuit for Code Division Multiple Access (CDMA) based mobile stations as recited in claim 1, wherein the filtering means comprises:

unscaled filtering means for separately filtering the signals $F_i$, $F_q$, $S_{1i}$, $S_{1q}$, $S_{4i}$, $S_{4q}$, $S_{5i}$, and $S_{5q}$; and scaled filtering means for separately filtering the signals $S_{2i}$, $S_{2q}$, $S_{3i}$, $S_{3q}$, $S_{6i}$, $S_{6q}$, $S_{7i}$, and $S_{7q}$.

6. A reverse traffic channel circuit for Code Division Multiple Access (CDMA) based mobile stations as recited in claim 5, wherein the scaled filtering scales signals by $$\frac{1}{\sqrt{2}}.$$

7. A reverse traffic channel method for Code Division Multiple Access (CDMA) based mobile stations, comprising the steps of separately receiving a digital fundamental input signal $A_0$ and a plurality of digital supplemental channel input signals $A_1$ to $A_7$;

quadrature spreading the fundamental channel input signal and each supplemental channel input signal to produce, respectively, a fundamental in-phase channel signal $F_i$, and a fundamental quadrature channel signal $F_q$, and separate supplemental in-phase channel signals $S_{1i}$, $S_{2i}$, ... $S_{7i}$, and supplemental quadrature channel signals $S_{1q}$, $S_{2q}$, ... $S_{7q}$;

separately filtering and scaling the fundamental in-phase channel signal $F_i$, the fundamental quadrature channel signal $F_q$, the separate supplemental in-phase channel signals $S_{1i}$, $S_{2i}$, ... $S_{7i}$, and the separate supplemental quadrature channel signals $S_{1q}$, $S_{2q}$, ... $S_{7q}$;

combining the filtered fundamental in-phase channel signal $F_i'$, some of the separate filtered supplemental in-phase channel signals $S_{1i}'$, $S_{2i}'$, ... $S_{7i}'$, and some of the separate filtered supplemental quadrature channel signals $S_{1q}'$, $S_{2q}'$, ... $S_{7q}'$ according to the following formula:

$$\left[ F'_i + S'_{lq} + \frac{S'_{2i}}{\sqrt{2}} + \frac{S'_{2q}}{\sqrt{2}} - \frac{S'_{3i}}{\sqrt{2}} + \right.$$

$$\left. \frac{S'_{3q}}{\sqrt{2}} + S'_{4i} + S'_{5q} + \frac{S'_{6i}}{\sqrt{2}} + \frac{S'_{6q}}{\sqrt{2}} - \frac{S'_{7i}}{\sqrt{2}} + \frac{S'_{7q}}{\sqrt{2}} \right]$$

to produce an overall in-phase digital output signal; combining the fundamental filtered quadrature channel signal $F_q'$, and some of the separate filtered supplemental in-phase channel signals $S_{1i}'$, $S_{2i}'$, ... $S_{7i}'$, and the separate filtered supplemental quadrature channel signals $S_{1q}'$, $S_{2q}'$, ... $S_{7q}'$ according to the following formula:

$$\left[ F'_q - S'_{li} - \frac{S'_{2i}}{\sqrt{2}} + \frac{S'_{2q}}{\sqrt{2}} - \frac{S'_{3i}}{\sqrt{2}} - \right.$$

$$\left. \frac{S'_{3q}}{\sqrt{2}} + S'_{4q} - S'_{5i} - \frac{S'_{6i}}{\sqrt{2}} + \frac{S'_{6q}}{\sqrt{2}} - \frac{S'_{7i}}{\sqrt{2}} - \frac{S'_{7q}}{\sqrt{2}} \right]$$

to produce an overall quadrature digital output signal;

converting each of the overall in-phase digital output signal and the overall quadrature digital output signal into a corresponding overall in-phase analog output signal and a corresponding overall analog quadrature output signal, respectively; and quadrature modulating the overall in-phase analog output signal with a phase-offset carrier term cos($2\pi f_c t$) to produce a first quadrature modulated result signal, quadrature modulating the overall quadrature analog output signal with a phase-offset carrier term sin($2\pi f_c t$) to produce a second quadrature modulated result signal, where $f_c$ is the carrier frequency and t is time, and combining the first quadrature modulated result signal with the second quadrature modulated result signal to produce a radio frequency output signal S(t).

8. A reverse traffic channel method for Code Division Multiple Access (CDMA) based mobile stations as recited in claim 7 further comprising the step of delaying the quadrature spread signals of each of quadrature channel signals of each of the fundamental channel and the supplemental channels by a predetermined delay period after the quadrature spreading step and before the filtering step.

9. A reverse traffic channel method for Code Division Multiple Access (CDMA) based mobile stations as recited in claim 8, wherein the delay period is 406.9 ns.

10. A reverse traffic channel method for Code Division Multiple Access (CDMA) based mobile stations as recited in claim 7, wherein the filtering means comprises:

separately unscaled filtering of the signals $F_i$, $F_q$, $S_{1i}$, $S_{1q}$, $S_{4i}$, $S_{4q}$, $S_{5i}$, and $S_{5q}$; and separately scaled filtering of the signals $S_{2i}$, $S_{2q}$, $S_{3i}$, $S_{3q}$, $S_{6i}$, $S_{6q}$, $S_{7i}$, and $S_{7q}$.

11. A reverse traffic channel method for Code Division Multiple Access (CDMA) based mobile stations as recited in claim 10, wherein the scale filtering step scales signals by $$\frac{1}{\sqrt{2}}.$$

12. A reverse traffic channel circuit for Code Division Multiple Access (CDMA) based mobile stations, comprising:

a plurality of input terminal means for separately receiving a digital fundamental input signal $A_0$ and a plurality of digital supplemental channel input signals $A_1$ to $A_7$;

quadrature spreading means for quadrature spreading the fundamental channel input signal and each supplemental channel input signal to produce, respectively, a fundamental in-phase channel signal $F_i$, and a fundamental quadrature channel signal $F_q$, and separate supplemental in-phase channel signals $S_{1i}$, $S_{2i}$, ... $S_{7i}$, and supplemental quadrature channel signals $S_{1q}$, $S_{2q}$, ... $S_{7q}$;

first combining means for combining the fundamental in-phase channel signal $F_i$, the fundamental quadrature channel signal $F_q$, the separate supplemental in-phase channel signals $S_{1i}$, $S_{2i}$, ... $S_{7i}$, and the separate supplemental quadrature channel signals $S_{1q}$, $S_{2q}$, ... $S_{7q}$ according to the following groupings:

$$(F_i + S_{4i}); \left(\frac{S_{2i}}{\sqrt{2}} - \frac{S_{3i}}{\sqrt{2}} + \frac{S_{6i}}{\sqrt{2}} - \frac{S_{7i}}{\sqrt{2}}\right); \quad (a)$$

$$(S_{1q} + S_{5q}); \left(\frac{S_{2q}}{\sqrt{2}} + \frac{S_{3q}}{\sqrt{2}} + \frac{S_{6q}}{\sqrt{2}} + \frac{S_{7q}}{\sqrt{2}}\right),$$

second combining means for combining the fundamental in-phase channel signal $F_i$, the fundamental quadrature channel signal $F_q$, the separate supplemental in-phase channel signals $S_{1i}$, $S_{2i}$, ... $S_{7i}$, and the separate supplemental quadrature channel signals $S_{1q}$, $S_{2q}$, ... $S_{7q}$ according to the following groupings:

$$(F_q + S_{4q}); \left(-\frac{S_{2i}}{\sqrt{2}} - \frac{S_{3i}}{\sqrt{2}} - \frac{S_{6i}}{\sqrt{2}} - \frac{S_{7i}}{\sqrt{2}}\right); \quad (b)$$

$$(-S_{1i} - S_{5i}); \left(\frac{S_{2q}}{\sqrt{2}} - \frac{S_{3q}}{\sqrt{2}} + \frac{S_{6q}}{\sqrt{2}} + \frac{S_{7q}}{\sqrt{2}}\right),$$

filtering means for separately filtering and scaling each of the signals of the groupings (a) and (b) above;

third combining means for combining the filtered signal groupings of group (a) to produce an overall in-phase digital output signal;

fourth combining means for combining the filtered signal groupings of group (b) to produce an overall quadrature digital output signal;

digital to analog means for converting each of the overall in-phase digital output signal and the overall quadrature digital output signal into a corresponding overall in-phase analog output signal and a corresponding overall analog quadrature output signal, respectively; and quadrature modulating means for quadrature modulating the overall in-phase analog output signal with a phase-offset carrier term $\cos(2\pi f_c t)$ to produce a first quadrature modulated result signal, quadrature modulating the overall quadrature analog output signal with a phase-offset carrier term $\sin(2\pi f_c t)$ to produce a second quadrature modulated result signal, where $f_c$ is the carrier frequency and t is time, and combining the first quadrature modulated result signal with the second quadrature modulated result signal to produce a radio frequency output signal S(t).

13. A reverse traffic channel circuit for Code Division Multiple Access (CDMA) based mobile stations as recited in claim 12, further comprising, in the quadrature channels of each of the fundamental channel and the supplemental channels, separate delay means connected in series between the quadrature spreading means and the filtering means for delaying the quadrature spread signals by a predetermined delay period.

14. A reverse traffic channel circuit for Code Division Multiple Access (CDMA) based mobile stations as recited in claim 13, wherein the delay period is 406.9 ns.

15. A reverse traffic channel method for Code Division Multiple Access (CDMA) based mobile stations, comprising the steps of:

separately receiving a digital fundamental input signal $A_0$ and a plurality of digital supplemental channel input signals $A_1$ to $A_7$;

quadrature spreading the fundamental channel input signal and each quadrature channel input signal to produce, respectively, the fundamental in-phase channel signal $F_i$, and a fundamental quadrature channel signal $F_q$, and separate supplemental in-phase channel signals $S_{1i}$, $S_{2i}$, ... $S_{7i}$, and supplemental quadrature channel signals $S_{1q}$, $S_{2q}$, ... $S_{7q}$;

combining the fundamental in-phase channel signal $F_i$, some of the separate supplemental in-phase channel signals $S_{1i}$, $S_{2i}$, ... $S_{7i}$, and some of the separate supplemental quadrature channel signals $S_{1q}$, $S_{2q}$, ... $S_{7q}$ according to the following groupings:

$$(F_i + S_{4i}); \left(\frac{S_{2i}}{\sqrt{2}} - \frac{S_{3i}}{\sqrt{2}} + \frac{S_{6i}}{\sqrt{2}} - \frac{S_{7i}}{\sqrt{2}}\right); \quad (a)$$

$$(S_{1q} + S_{5q}); \left(\frac{S_{2q}}{\sqrt{2}} + \frac{S_{3q}}{\sqrt{2}} + \frac{S_{6q}}{\sqrt{2}} + \frac{S_{7q}}{\sqrt{2}}\right),$$

combining the fundamental quadrature channel signal $F_q$, some of the separate supplemental in-phase channel signals $S_{1i}$, $S_2$, ... $S_{7i}$, and some of the separate supplemental quadrature channel signals $S_{1q}$, $S_{2q}$, ... $S_{7q}$ according to the following groupings:

$$(F_q + S_{4q}); \left(-\frac{S_{2i}}{\sqrt{2}} - \frac{S_{3i}}{\sqrt{2}} - \frac{S_{6i}}{\sqrt{2}} - \frac{S_{7i}}{\sqrt{2}}\right); \quad (b)$$

$$(-S_{1i} - S_{5i}) \cdot \left( \frac{S_{2q}}{\sqrt{2}} - \frac{S_{3q}}{\sqrt{2}} + \frac{S_{6q}}{\sqrt{2}} + \frac{S_{7q}}{\sqrt{2}} \right),$$

separately filtering and scaling each of the signals of the groupings (a) and (b) above;

combining the filtered signal groupings of group (a) to produce an overall in-phase digital output signal;

combining the filtered signal groupings of group (b) to produce an overall quadrature digital output signal;

converting each of the overall in-phase digital output signal and the overall quadrature digital output signal into a corresponding overall in-phase analog output signal and a corresponding overall analog quadrature output signal, respectively; and quadrature modulating the overall in-phase analog output signal with a phase-offset carrier term $\cos(2\pi f_c t)$ to produce a first quadrature modulated result signal, quadrature modulating the overall quadrature analog output signal with a phase-offset carrier term $\sin(2\pi f_c t)$ to produce a second quadrature modulated result signal, where $f_c$ is the carrier frequency and t is time, and combining the first quadrature modulated result signal with the second quadrature modulated result signal to produce a radio frequency output signal S(t).

16. A reverse traffic channel method for Code Division Multiple Access (CDMA) based mobile stations as recited in claim 15 further comprising the step delaying the quadrature spread signals of each of quadrature channel signals of each of the fundamental channel and the supplemental channels by a predetermined delay period of after the quadrature spreading step and before the filtering step.

17. A reverse traffic channel method for Code Division Multiple Access (CDMA) based mobile stations as recited in claim 16, wherein the delay period is 406.9 ns.

* * * * *